United States Patent [19]

Andrews

[11] 3,928,154
[45] Dec. 23, 1975

[54] ELECTROCHEMICAL RADIUS GENERATION

[75] Inventor: James D. Andrews, Bloomfield Village, Mich.

[73] Assignee: TRW Inc., Cleveland, Ohio

[22] Filed: Apr. 12, 1973

[21] Appl. No.: 350,388

[52] U.S. Cl. .......................... 204/129.5; 204/129.6
[51] Int. Cl.² ...................... C25F 3/00; C25F 5/00
[58] Field of Search ................. 204/129.6, 129.5

[56] References Cited
UNITED STATES PATENTS

| | | | |
|---|---|---|---|
| 2,784,155 | 3/1957 | Heinrich | 204/129.6 |
| 2,827,427 | 3/1958 | Barry et al. | 204/129.6 |
| 2,895,814 | 7/1959 | Clark | 204/129.6 |
| 2,913,383 | 11/1959 | Topfer | 204/129.6 |
| 3,085,055 | 4/1963 | Bradley | 204/129.6 |
| 3,130,138 | 4/1964 | Faust et al. | 204/129.6 |
| 3,384,563 | 5/1968 | Taylor | 204/129.6 |
| 3,409,524 | 11/1968 | Olson | 204/129.6 |
| 3,445,372 | 5/1969 | Fromson | 204/129.6 |
| 3,629,093 | 12/1971 | Sickels | 204/129.6 |
| 3,849,273 | 11/1974 | Johnson | 204/129.5 |

FOREIGN PATENTS OR APPLICATIONS 1,303,245   1/1973   United Kingdom............. 204/129.6

*Primary Examiner*—Oscar R. Vertiz
*Assistant Examiner*—Wayne A. Langel
*Attorney, Agent, or Firm*—Hill, Gross, Simpson, Van Santen, Steadman, Chiara & Simpson

[57] ABSTRACT

Method of generating a uniform radius on a workpiece by electrochemical means wherein a nozzle is positioned in spaced relationship to an edge of a workpiece, a charged electrolyte is passed through the nozzle to impinge upon the edge, and the nozzle is moved along the contour of the workpiece to thereby provide controlled removal of any irregularities on the edge, resulting in a smooth radius being formed at the edge.

8 Claims, 5 Drawing Figures

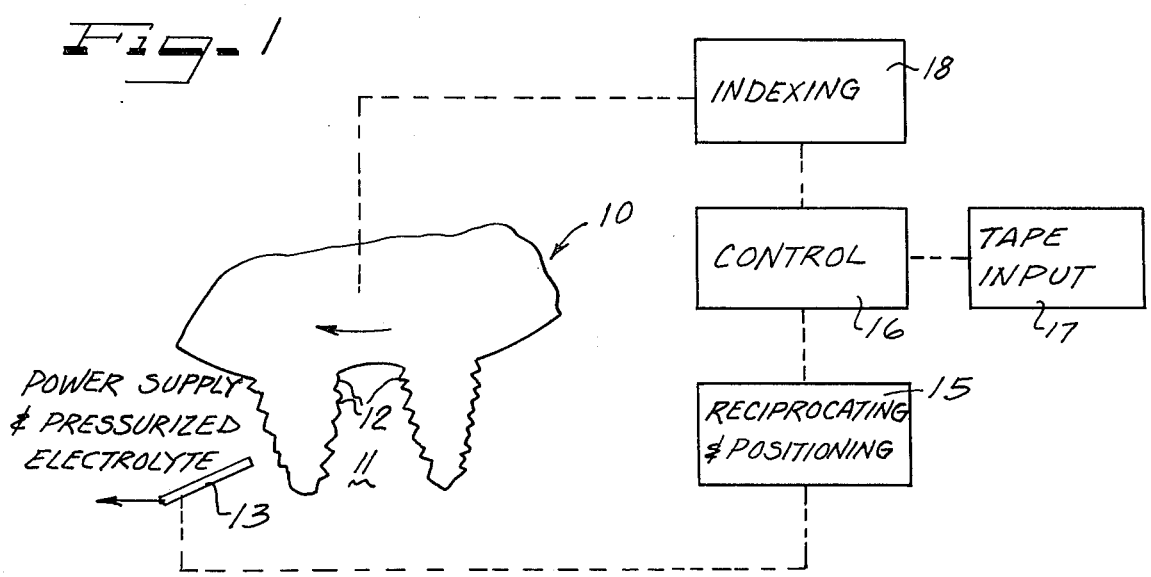
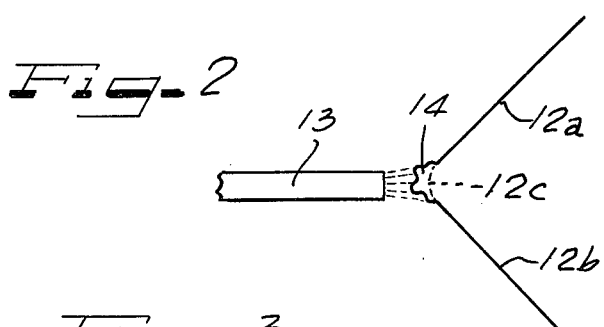
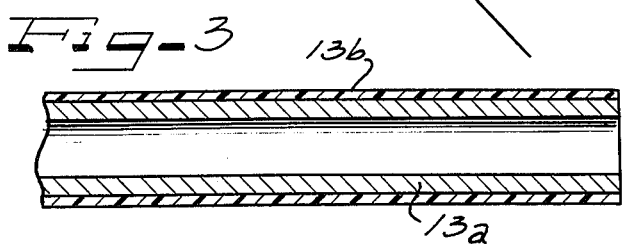
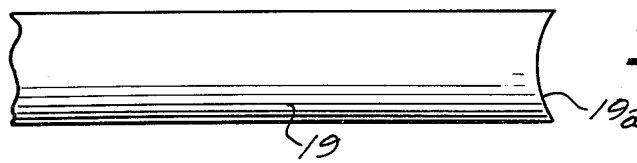
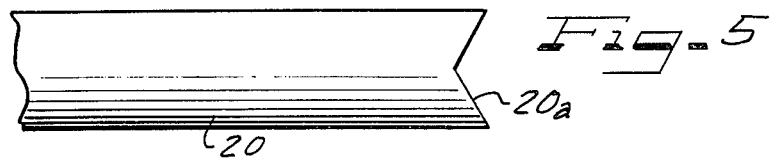

ELECTROCHEMICAL RADIUS GENERATION

BACKGROUND OF THE INVENTION

1. Field of the Invention

This invention is in the field of electrochemical generation of smooth edges through the use of controlled conditions of traversing an electrode along the contour of a workpiece to produce a controlled amount of metal removal and the elimination of sharp edges.

2. Description of the Prior Art

The field of electrochemical machining has geen actively developed in the past several decades. Electrochemical machining involves the use of a tool in the form of a nozzle which is made cathodic and which cooperates with an anodic workpiece through an electrolyte which contacts both the tool and the workpiece. Upon flow of electric current through the electrolyte, material of the workpiece is removed. Essentially, these processes have been used for drilling small diameter holes in metals which are difficult to drill mechanically.

One of the earliest electrochemical machining processes and one which is still in considerable use today is known as the shaped tube electrolytic machining process. It is generally used to produce long, small diameter holes on the order of 0.020 to 0.125 inches in diameter. This type of process conventionally uses an acid electrolyte, such as a 10% solution of sulfuric acid, but hydrochloric acid can also be used. The power source consists of a 5½ to 9 volt periodically reversing direct current wherein a cathodic tool is maintained electrically negative for most of the drilling operation but is rendered positive for a short duration of each cycle. Electrodes used with this type of process are usually titanium tubes with dielectric coating. The electrolyte pressure is relatively low in this process being on the order of 5 pounds per square inch.

Another type of electrochemical machining process uses a salt electrolyte with a high electrolyte pressure and without current reversal. Typically, electrolyte pressures of 100 to 400 pounds per square inch are employed, dc voltages of 9 to 30 volts, and current densities of about 1000 amperes per square foot of effective electrode area. This type of process is frequently used for cavity sinking but occasionally it has been used for deburring. When so used, it is necessary to mask the areas which are to be shielded from contact with the electrolyte. Deburring can be accomplished to a reasonable extent with this type of process at a high current density, but at low current densities pitting may occur. This type of process is also not satisfactory for producing controlled surface finishes on workpieces.

A third type of process of more recent origin is the impingement process which has been used to drill extremely small holes in tough metals such as nickel base superalloys. With this process, it is possible to drill holes having a diameter on the order of 0.005 to 0.020 inches. Generally, the impingement process makes use of a glass tube nozzle with an electrode behind the tip of the nozzle. The inner diameter of the electrode is on the order of 0.003 inches. The impingement process is operated under conditions of relatively high resistance and high voltage, on the order of 300 to 600 volts dc. Either a salt or an acid electrolyte is used. Electrolyte pressures in this type of process are typically on the order of 20 to 100 pounds per square inch.

The present invention adapts the previously used techniques electrochemical machining to the problem of uniform radius generation. This problem is particularly acute in the manufacture of critical components such as turbine wheels and blades for use in jet turbine engines. The presence of an irregular burr or other non-uniformity on an edge or corner of such components is highly undesirable because the burr serves as a focal point for stress concentration. It is accordingly necessary that such critical components be deburred prior to assembly into the engine, so that they are provided with smoothly formed radii rather than irregular projections. Heretofore, this deburring has been accomplished by hand, using carbide tipped drills not unlike a dentist's drill. Since even an ordinary size turbine wheel requires as much as 80 hours of mechanical deburring, it will be seen that this laborious hand operation significantly contributes to the time and cost of producing components for jet engines.

SUMMARY OF THE INVENTION

The present invention provides a method of electrochemical uniform radius generation wherein a nozzle is positioned in spaced relationship to an edge of a workpiece to be finished and a charged electrolyte is sprayed through the nozzle to impinge on the edge and thereby effect a controlled amount of stock removal. By suitable control of the electrode size, its geometry, the electrolyte pressure, the gap between the electrode and the work, the voltage of the power supply, and particularly the feed rate of the electrode, a smoothly formed radius is formed on the edge being finished. The nozzle is moved along the contour of the workpiece at a rate ranging broadly from about 1/32 to 6 inches per minute, depending upon the metal and the spacing. In the case of finishing an edge formed by two surfaces intersecting at a right angle, the nozzle is positioned at substantially a right angle to the line of intersection of the edges, i.e., substantially along the line which bisects the angle of intersection of the two faces.

The process of the present invention is applicable with any of the three types of electromachining techniques previously mentioned. Electrolytes consisting of sulfuric acid, hydrochloric acid and/or salt water or specialized electrolytes can thus be employed. The voltage, however, usually ranges about 2 to 3 times the voltage employed for a comparable hole drilling process because of the greater spacing involved between the electrode and the edge of the workpiece. Unlike hole drilling, however, the new electrochemical process involves electrolytic action on a limited area of the piece, since the spray issuing from the nozzle is dissipated immediately, thereby stopping further electrochemical action. It should also be noted that the newly described process represents a condition of zero wear on the electrode since the electrode never comes in contact with corrosion products as it does in the case of electrochemical hole drilling.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a schematic representation of an automated deburring system employing the principles of the present invention;

FIG. 2 is a greatly enlarged view of a nozzle and workpiece during the deburring operation;

FIG. 3 is a cross-sectional view of a typical electrode which can be used for the purposes of the present invention;

FIG. 4 is a view in elevation of another form of electrode geometry; and

FIG. 5 is a view in elevation of still a further modified form of electrode.

DESCRIPTION OF THE PREFERRED EMBODIMENTS

The embodiment of the invention shown in the drawings is directed to electrochemical deburring but it should be realized that the new process is applicable to forming a uniform edge on a workpiece whether the non-uniformity results from a burr or other irregularity.

In FIG. 1 reference numeral 10 indicates generally an object to be deburred which in this case is a turbine wheel having a plurality of sockets 11 thereabout into which the fir-tree root portion of a turbine blade is arranged to be received. The turbine wheel 10 has angular projections 12 therealong which are complementary in shape to the projections on the root portion of the turbine blade and which are subject to the presence of burrs from previous manufacturing operations. A nozzle 13 is positioned to direct a spray of electrolyte directly at the edges of the projections 12. In FIG. 2, which represents a greatly enlarged view of one such projection, including edges 12a and 12b intersecting at substantially a right angle, and with a burr 14 being formed thereon, it will be seen that the nozzle 13 directs a spray of electrolyte at right angles to the corner, i.e., along a line of the series of lines which substantially bisect the angles formed by the faces 12a and 12b. While the position shown in FIG. 2 is a preferred position, the orientation of the nozzle with respect to the burr can be varied somewhat, usually by a factor of 20° or so in either direction and still achieve reasonably good results. In the case of a rounded projection, the spray is preferably directed at a line which is perpendicular to the tangent of the rounded projection, at its maximum dimension.

The electrode 13 shown in FIG. 2 is of the type shown more specifically in FIG. 3, and consists of a tube 13a composed of a titanium alloy or the like, covered with a very thin dielectric coating 13b. For most purposes, the outer diameter of the electrode will be in the range from about 0.020 to 0.045 inches, but larger electrodes can be used for special applications. In the case of an electrolyte containing about 20% sulfuric acid, electrolyte pressures of about 15 to 80 pounds per square inch will normally be employed, although the pressure is not particularly critical.

Of greater importance is the gap between the electrode and the work which for most purposes should be about 0.020 to 0.040 inches. At spacings greater than about 0.040 inch, a much slower feed rate would be employed.

The feed rate of the electrode with respect to the workpiece is probably the most important single parameter to secure adequate electrochemical deburring. This feed rate can vary from about 1/32 inch to 6 inches per minute but may be as low as 1/32 to ¼ inch per minute in the case of nickel base superalloys. For stainless steels, typical feed rates range from about ½ to 4 inches per minute.

Returning to FIG. 1, the nozzle 13 is movable along the edge to be deburred and may also be arranged for pivotal movement. The mechanical instrumentation for achieving this movement is not part of the present invention as it should be apparent that the process involved can be performed by hand. In FIG. 1, however, there is illustrated schematically an automated system for continuous deburring in which the reciprocating and the angular positioning of the nozzle 13 is controlled by a reciprocating and positioning device 15 which, in turn, is under the control of a unit 16. A tape input 17 which generates signals in response to a punched tape or a magnetic tape feeds such signals to the control unit 16. An indexing unit 18 also under the control of the control unit 16 provides for incremental rotation of the turbine wheel 10 when a new face is to be presented to the electrified stream of electrolyte. While only one nozzle 13 is shown in the drawings, it should be evident that in normal installations more than one would be used so that two or more surfaces of the article being deburred can be operated upon simultaneously.

The nozzle 13 is thus caused to reciprocate along each of the projections 12 at a uniform feed rate with incremental rotation of the turbine wheel 10 so that the nozzle follows the entire contour of the surfaces to be deburred, the position of the nozzle and the passage of electrolyte therethrough being maintained substantially along a line of the series of lines that bisect the angles formed at the projections 12. As a result, as shown in FIG. 2, the burr 14 is removed leaving a rounded radius 12c of much more uniform configuration than could be achieved with mechanical deburring.

For particular applications, it may be desirable to shape the nozzle specifically to the contour of the article being deburred. One such nozzle is illustrated in FIG. 4 where a nozzle 19 is shown having a concave discharge end 19a. In FIG. 5, there is shown a nozzle 20 having a V-shaped discharge end 20a.

To illustrate the inter-relationship between the variables in the process, the following tests were made utilizing an electrode having an outer diameter of 0.014 inches and a wall thickness of 0.004 inches, with an electrolyte pressure of 15 pounds per square inch.

TABLE 1

| No. | Gap, in. | Voltage | Feed In./min. | Radius | Stock Removal, in. |
|---|---|---|---|---|---|
| 1 | .020 | 6.5 | .500 | .002 | .0005 |
| 2 | .040 | 6.5 | .500 | .0007 | .0007 |
| 3 | .060 | 6.5 | .500 | .0007 | .0005 |
| 4 | .020 | 13.0 | .500 | .0005 | .0005 |
| 5 | .040 | 13.0 | .500 | .0005 | .0005 |
| 6 | .060 | 13.0 | .500 | .0005 | .0005 |
| 7 | .020 | 19.5 | .500 | .001 | .001 |
| 8 | .040 | 19.5 | .500 | .001 | .005 |
| 9 | .060 | 19.5 | .500 | .0005 | .001 |

In the following series of tests, the electrode had an outer diameter of 0.029 inches, and the electrolyte pressure was 15 pounds per square inch:

| No. | Gap, in. | Voltage | Feed In./min. | Radius | Stock Removal, in. |
|---|---|---|---|---|---|
| 10 | .020 | 6.5 | .125 | .006 | .004 |
| 11 | .040 | 6.5 | .125 | .002 | .002 |
| 12 | .060 | 6.5 | .125 | .001 | .001 |
| 13 | .020 | 13.0 | .125 | .019 | .008 |
| 14 | .040 | 13.0 | .125 | .010 | .0055 |
| 15 | .060 | 13.0 | .125 | .006 | .0045 |

-continued

| No. | Gap, in. | Voltage | Feed In./min. | Radius | Stock Removal, in. |
|---|---|---|---|---|---|
| 16 | .020 | 19.5 | .125 | .046 | .011 |
| 17 | .040 | 19.5 | .125 | .018 | .008 |
| 18 | .060 | 19.5 | .165 | .011 | .0065 |
| 19 | .020 | 6.5 | .250 | .002 | .0025 |
| 20 | .040 | 6.5 | .250 | .002 | .002 |
| 21 | .060 | 6.5 | .250 | .001 | .001 |
| 22 | .020 | 13.0 | .250 | .006 | .006 |
| 23 | .040 | 13.0 | .250 | .003 | .0035 |
| 24 | .060 | 13.0 | .250 | .002 | .003 |
| 25 | .020 | 19.5 | .250 | .015 | .008 |
| 26 | .040 | 19.5 | .250 | .015 | .007 |
| 27 | .060 | 19.5 | .250 | .009 | .005 |
| 28 | .020 | 6.5 | .500 | .001 | .001 |
| 29 | .040 | 6.5 | .500 | — | .002 |
| 30 | .060 | 6.5 | .500 | — | .0005 |
| 31 | .020 | 13.0 | .500 | .001 | .0015 |
| 32 | .040 | 13.0 | .500 | .002 | .0015 |
| 33 | .060 | 13.0 | .500 | .001 | .002 |
| 34 | .020 | 19.5 | .500 | .004 | .0045 |
| 35 | .040 | 19.5 | .500 | .002 | .002 |
| 36 | .060 | 19.5 | .500 | .001 | .0025 |
| 37 | .010 | 19.5 | .250 | .023 | .0085 |
| 38 | .010 | 19.5 | .250 | .018 | .0075 |
| 39 | .010 | 19.5 | .250 | .023 | .0095 |

In the following series of tests, the outer diameter of the electrode was 0.029 inches and the electrolyte pressure was varied.

TABLE 3

| No. | Pressure | Gap, in. | Voltage | Feed In./min. | Radius | Stock Removal, in. |
|---|---|---|---|---|---|---|
| 40 | 30 psi | .010 | 19.5 | .250 | .034 | .009 |
| 41 | 30 psi | .010 | 19.5 | .250 | .035 | .009 |
| 42 | 30 psi | .010 | 19.5 | .250 | .022 | .011 |
| 43 | 30 psi | .020 | 19.5 | .250 | .014 | .007 |
| 44 | 30 psi | .030 | 19.5 | .250 | .015 | .0065 |
| 45 | 30 psi | .040 | 19.5 | .250 | .006 | .0045 |
| 46 | 10 psi | .005 | 19.5 | .250 | .025 | .009 |
| 47 | 20 psi | .005 | 19.5 | .250 | .025 | .0095 |
| 48 | 30 psi | .005 | 19.5 | .250 | .024 | .008 |
| 49 | 40 psi | .005 | 19.5 | .250 | .025 | .008 |
| 50 | 50 psi | .005 | 19.5 | .250 | .026 | .010 |
| 51 | 40 psi | .020 | 19.5 | .250 | .016 | .0075 |
| 52 | 50 psi | .020 | 19.5 | .250 | .009 | .006 |
| 53 | 60 psi | .020 | 19.5 | .250 | .010 | .007 |
| 54 | 70 psi | .020 | 19.5 | .250 | .012 | .0065 |
| 55 | 30 psi | .010 | 19.5 | .125 | Flat | .0125 |
| 56 | 30 psi | .010 | 19.5 | .250 | .022 | .0075 |
| 57 | 30 psi | .010 | 19.5 | .500 | .014 | .005 |
| 58 | 30 psi | .010 | 19.5 | .750 | .001 | .003 |
| 59 | 30 psi | .010 | 19.5 | 1.0 | .0005 | .0025 |
| 60 | 20 psi | .020 | 19.5 | .250 | .015 | .0065 |
| 61 | 30 psi | .020 | 19.5 | .250 | .015 | .0065 |
| 62 | 40 psi | .029 | 19.5 | .250 | .017 | .007 |
| 63 | 50 psi | .020 | 19.5 | .250 | .018 | .008 |

In the following series of tests, the outer diameter of the electrode was 0.050 inches and the wall thickness was 0.006 inches. An electrolyte pressure of 15 pounds per square inch was used in each test:

TABLE 4

| No. | Gap, In. | Voltage | Feed In./min. | Radius | Stock Removal, in. |
|---|---|---|---|---|---|
| 64 | .020 | 6.5 | .500 | .003 | .0035 |
| 65 | .040 | 6.5 | .500 | .001 | .0015 |
| 66 | .060 | 6.5 | .500 | .0005 | .0005 |
| 67 | .020 | 13.0 | .500 | .007 | .004 |
| 68 | .040 | 13.0 | .500 | .008 | .004 |
| 69 | .060 | 13.0 | .500 | .001 | .0025 |
| 70 | .020 | 19.5 | .500 | .005 | .007 |
| 71 | .040 | 19.5 | .500 | .005 | .0055 |
| 72 | .060 | 19.5 | .500 | .003 | .0045 |
| 73 | .020 | 6.5 | .250 | .002 | .004 |
| 74 | .040 | 6.5 | .250 | .002 | .002 |
| 75 | .060 | 6.5 | .250 | .001 | .001 |
| 76 | .020 | 13.0 | .250 | .013 | .008 |
| 77 | .040 | 13.0 | .250 | .007 | .0065 |

TABLE 4-continued

| No. | Gap, In. | Voltage | Feed In./min. | Radius | Stock Removal, in. |
|---|---|---|---|---|---|
| 78 | .060 | 13.0 | .250 | .005 | .004 |
| 79 | .020 | 19.5 | .250 | .025 | .012 |
| 80 | .040 | 19.5 | .250 | .013 | .009 |
| 81 | .060 | 19.5 | .250 | .009 | .006 |
| 82 | .020 | 6.5 | .125 | .006 | .006 |
| 83 | .060 | 6.5 | .125 | .002 | .003 |
| 84 | .020 | 13.0 | .125 | .034 | .0145 |
| 85 | .040 | 13.0 | .125 | .015 | .009 |
| 86 | .060 | 13.0 | .125 | .005 | .007 |
| 87 | .020 | 19.5 | .125 | .040 | .017 |
| 88 | .040 | 19.5 | .125 | .030 | .0125 |
| 89 | .060 | 19.5 | .125 | .016 | .011 |

In the following test, an electrode was used having a wall thickness of 0.012 which is twice the wall thickness used in the preceding table.

TABLE 5

| No. | Gap, in. | Voltage | Feed In./min. | Radius | Stock Removal, in. |
|---|---|---|---|---|---|
| 90 | .020 | 6.5 | .500 | .001 | .0005 |
| 91 | .040 | 6.5 | .500 | .001 | .0005 |
| 92 | .060 | 6.5 | .500 | .0005 | .0005 |
| 93 | .020 | 13.0 | .500 | .005 | .0035 |
| 94 | .040 | 13.0 | .500 | .001 | .002 |
| 95 | .060 | 13.0 | .500 | .001 | .001 |
| 96 | .020 | 19.5 | .500 | .008 | .0045 |
| 97 | .040 | 19.5 | .500 | .002 | .003 |
| 98 | .060 | 19.5 | .500 | .002 | .0015 |

In the following set of tests, an electrode having an outer diameter of 0.093 inches and a wall diameter of 0.010 inches was employed, along with an electrolyte pressure of 15 pounds per square inch.

TABLE 6

| No. | Gap, in. | Voltage | Feed In./min. | Radius | Stock Removal, in. |
|---|---|---|---|---|---|
| 99 | .020 | 19.5 | 500 | .014 | .0125 |
| 100 | .040 | 19.5 | 500 | .011 | .014 |
| 101 | .060 | 19.5 | 500 | .008 | .0105 |

It will be noted from the foregoing tables that the two factors having the greatest influence upon the radius produced and the amount of stock removal are the gap and the feed rate and that for the other factors there is a reasonably wide latitude permissible in operation.

It will be seen that the process of the present invention provides a convenient, controllable method of deburring metals which lends itself to automated operation.

It will also be evident that various modifications can be made to the described embodiments without departing from the scope of the present invention.

I claim as my invention:

1. The method of generating a uniform radius on a workpiece having an extended edge which comprises positioning at least one generally tubular nozzle in spaced relationship to said edge of said workpiece, said nozzle being positioned to direct electrolyte substantially along a line of the series of lines that bisect the angles formed at said edge, passing a charged electrolyte through said nozzle and along said line to impinge upon said edge, and moving the nozzle along the contours of said edge while maintaining the position thereof and the passage of electrolyte therethrough substantially along one of said lines to thereby round off said edge.

2. The method of claim 1 in which said electrolyte is an acid electrolyte.

3. The method of claim 1 in which said electrolyte is a salt electrolyte.

4. The method of claim 1 in which said nozzle is moved at a rate of from 1/32 to 6 inches per minute.

5. The method of claim 1 in which said nozzle comprises a metallic tube having a dielectric coating thereon.

6. The method of claim 1 in which said electrode is spaced from said workpiece by a distance ranging from about 0.02 to 0.04 inch.

7. The method of claim 1 in which said nozzle has a concave exit end.

8. The method of claim 1 in which said nozzle has a V-notched exit end.

* * * * *